United States Patent [19]

Carbeau et al.

[11] Patent Number: 4,520,741
[45] Date of Patent: Jun. 4, 1985

[54] WASTE DISPOSAL

[75] Inventors: Richard W. Carbeau, Hingham, Mass.; James F. Martin, Dechard, Tenn.; John H. Lanier, Manchester, Tenn.; William L. Holt, Nashville, Tenn.

[73] Assignee: ENSCO, Inc., Little Rock, Ark.

[21] Appl. No.: 599,957

[22] Filed: Apr. 13, 1984

Related U.S. Application Data

[62] Division of Ser. No. 336,251, Dec. 31, 1981, Pat. No. 4,462,318.

[51] Int. Cl.³ .................................................. F23G 5/06
[52] U.S. Cl. ..................................... 110/344; 110/215; 110/238; 110/244
[58] Field of Search ................. 110/344, 345, 210–215, 110/225

[56] References Cited

U.S. PATENT DOCUMENTS

| | | | |
|---|---|---|---|
| 2,483,728 | 10/1949 | Glaeser | 110/244 |
| 3,267,890 | 8/1966 | Zinn et al. | 110/215 |
| 3,357,375 | 12/1967 | Brophy | 110/238 |
| 3,572,264 | 3/1971 | Mercer | 110/215 |
| 3,604,375 | 9/1971 | Bruns | 110/238 |
| 3,830,172 | 8/1974 | Hindenlang | 110/238 |
| 3,848,548 | 11/1974 | Bolejack et al. | 110/215 |
| 3,892,190 | 7/1975 | Sharpe | 110/238 |
| 4,320,709 | 3/1982 | Hladun | 110/215 |

Primary Examiner—Henry C. Yuen
Attorney, Agent, or Firm—Alan Ruderman

[57] ABSTRACT

Burning a waste fuel blend at very high temperatures (typically greater than 4000 deg. F.) for a very short period of time (typically a matter of milliseconds) in a primary combustion zone to break the complex hazardous/toxic hydrocarbons into less complex chemicals (such as CO, $CO_2$, $H_2$, OH, HCl, and $Cl_2$), passing the products of the primary zone into a secondary zone in which the products are maintained for a longer time (typically about 2 secs.) in turbulent conditions with excess air at lower combustion temperatures (typically 2000 to 2600 deg. F.) to reduce the primary zone products to a mixture of $H_2O$, $CO_2$ and acids such as HCl, and quenching the products of the secondary zone.

3 Claims, 9 Drawing Figures

WASTE DISPOSAL

This application is a division of application Ser. No. 336,251, filed Dec. 31, 1981, now U.S. Pat. No. 4,462,318.

This invention relates to waste and, more particularly, to a high temperature system for processing RCRA wastes.

A primary object of the present invention is to provide a system for reducing liquid and slurry hazardous or toxic hydrocarbon wastes, such as PCB's, to non-hazardous by-products, such as water and simple acids. Other objects include providing such systems which will meet environmental requirements, are portable, and will handle a variety of hazardous and toxic materials.

The invention features burning a waste fuel blend at very high temperatures (typically greater than 4000 deg. F.) for a very short period of time (typically a matter of milliseconds) in a primary combustion zone to break the complex hazardous/toxic hydrocarbons into less complex chemicals (such as $CO$, $CO_2$, $H_2$, $OH$, $HCl$, and $Cl_2$), passing the products of the primary zone into a secondary zone in which the product is maintained for a longer time (typically about 2 secs.) in turbulent conditions with excess air at lower combustion temperatures (typically 2000 to 2600 deg. F.) to reduce the primary zone products to a mixture of $H_2O$, $CO_2$ and acids such as $HCl$, and quenching the products of the secondary zone. Preferred embodiments feature fuel-rich combustion in the primary zone to reduce the production of oxides of nitrogen, scrubbing the secondary zone output after quench to neutralize acids, and a water spray into the outlet from the secondary zone both to reduce temperature and to insure that any free $Cl_2$ is changed to $HCl$. In such preferred embodiments, the peripheral wall of the secondary zone is held above the dew point of $HCl$ (about 500° F.), a negative pressure is maintained in both the primary and secondary combustion zones, and the diameter of the secondary zone is at least twice that of the primary zone to insure turbulent expansion into the former.

Other objects, features and advantages will appear from the following detailed description of a preferred embodiment of the invention, taken together with the attached drawings in which.

STRUCTURE

Figure 1:
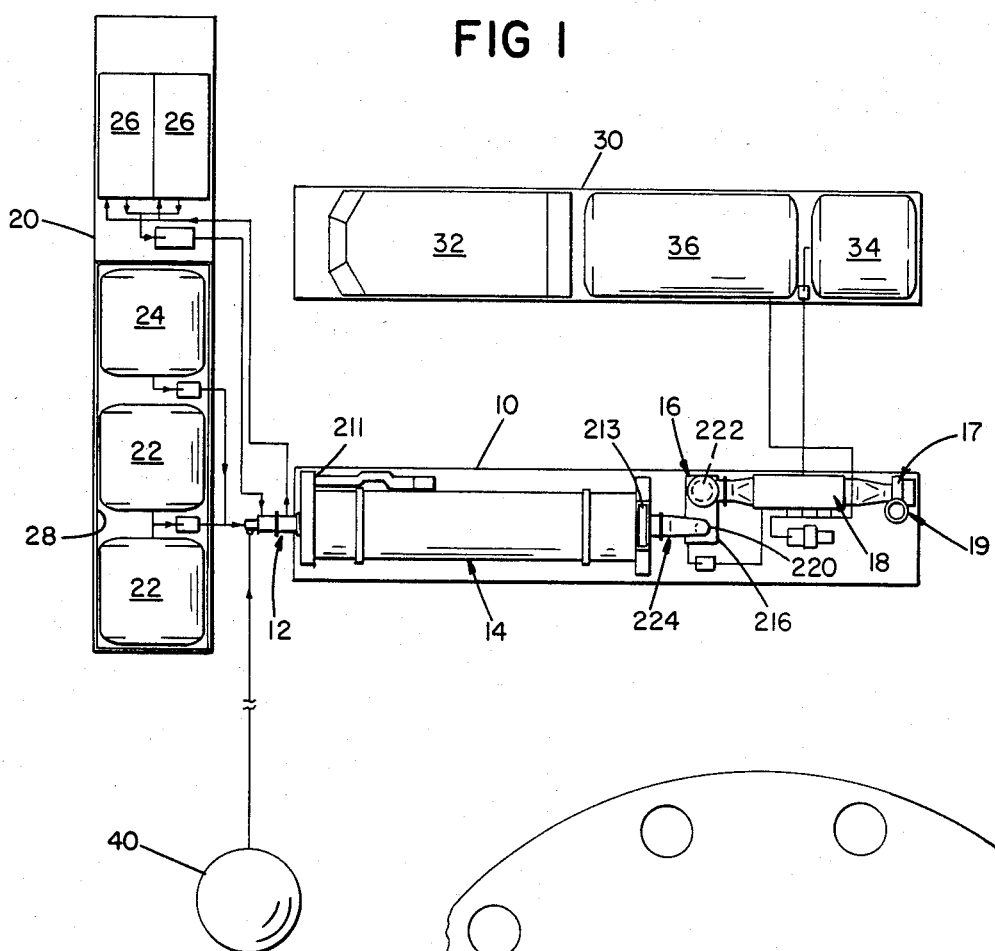
FIG. 1 is a plan schematic of a mobil waste treatment system embodying the invention.
Figure 2:
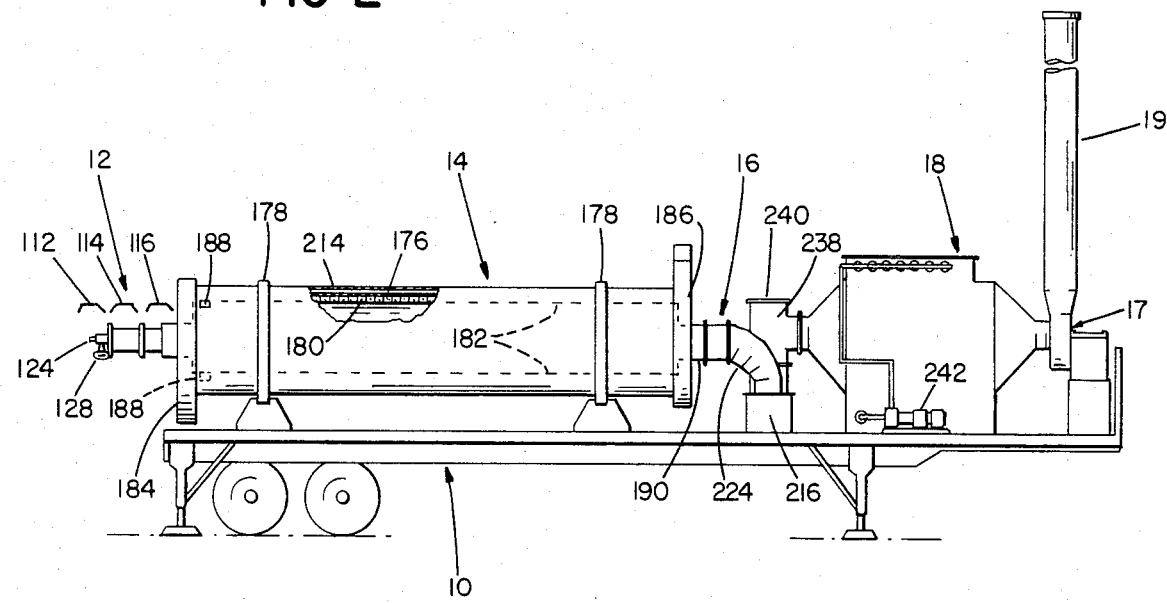
FIG. 2 is a side elevation of a portion of the system of FIG. 1.

Referring now to the drawings, and particularly to FIGS. 1 and 2, there is shown a mobile liquid incineration system mounted on three interconnected trailers. Combustion trailer 10 mounts the primary combustor 12 and secondary combustor 14, the quench system 16, a mass transfer scrubber 18 (Ceilcote Co.), a discharge fan 17, and a stack 19 (Ceilcote Co.). Ancillary trailer 20 mounts a pair of 2000 gallon waste/blend feed tanks 22, a 2000 gallon kerosene fuel tank 24, and a pair of cooling towers 26 (Baltimore Aircoil Co. Model No. VXT-75). The three tanks 22, 24 are mounted in a spill containment pan 28 having a total capacity of about 2500 gallons. The system control room 32, a 2000 gallon caustic feed tank 34, and a 4000 gallon waste caustic tank 36 are mounted on laboratory trailer 30. Each trailer is a Great Dane, Model No. GP-45, 45 feet long and 8 feet wide. The system includes also an 11,000 gallon liquid oxygen tank 40 which, for safety, is mounted at a distance from trailers 10, 20 and 30.

Primary combustor 12 includes a burner plate assembly 112 at its inlet end, a central combustion section 114, and at its outlet end a primary outlet/secondary inlet assembly 116. The burner plate assembly 112, central section 114 and outlet/inlet assembly are bolted together in axial alignment with each other and with secondary combustor 14.

Figure 4:
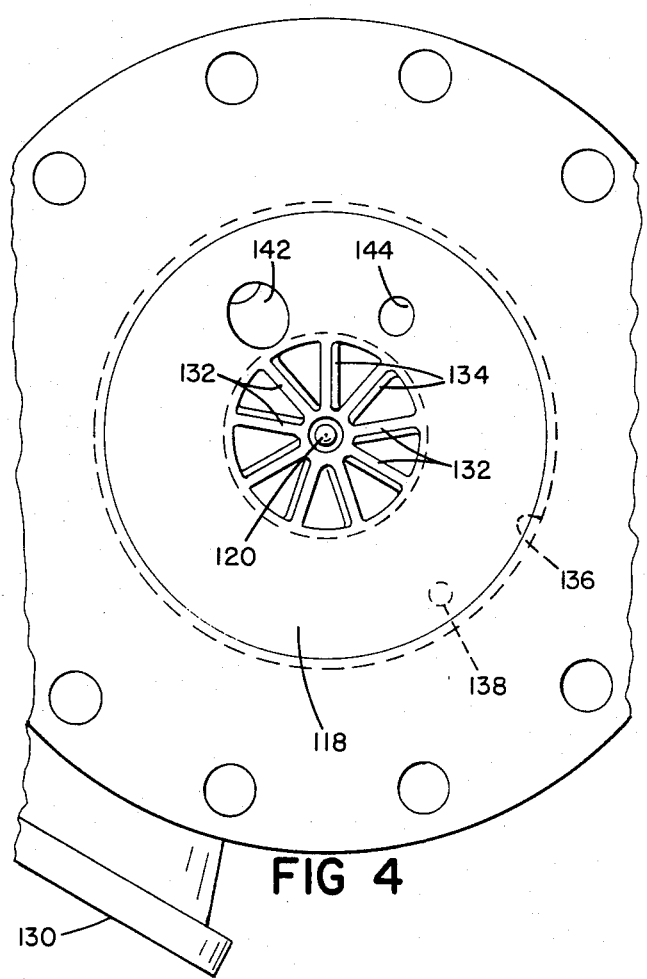
FIGS. 3–5 are sectional views of portions of the system of FIG. 1.
Figure 3:
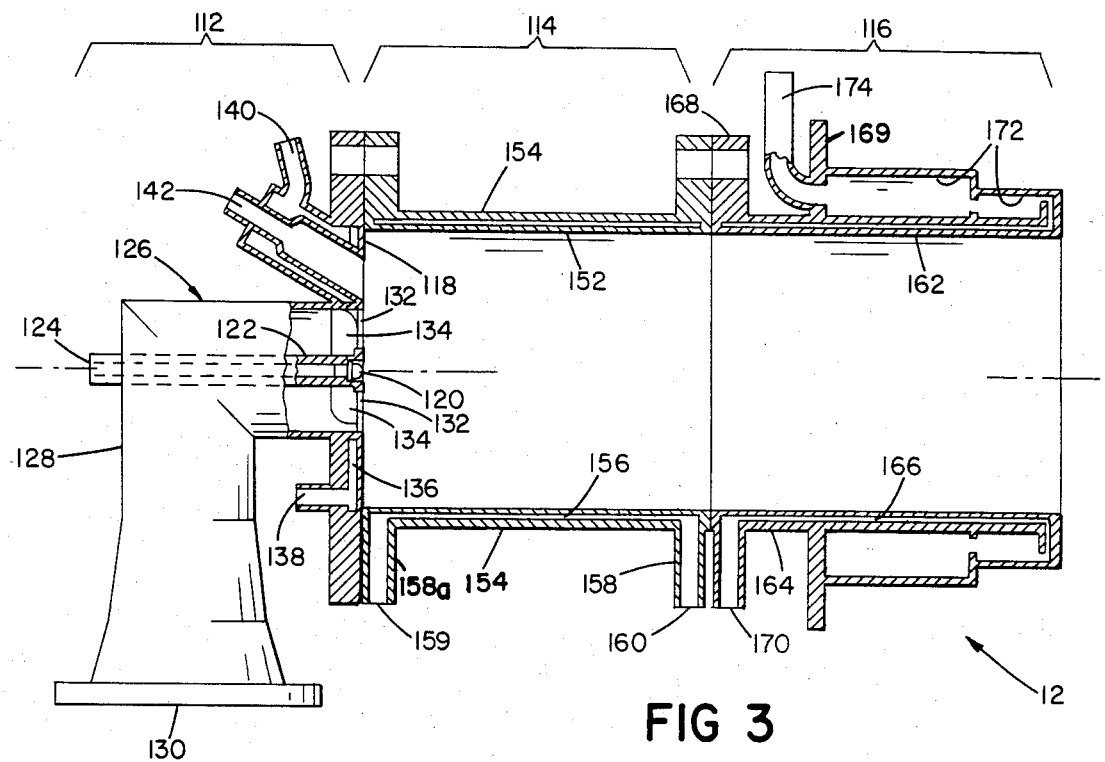

Burner plate assembly 112 is shown most clearly in FIGS. 3 and 4. As there shown, it includes a burner plate 118 mounted on the end of central section 114 and having an axial fuel/waste inlet nozzle 120 directed into the central section and connected through a drilled round bar 122 to a tapped inlet 124. A coaxial air/oxygen pipe 126 surrounds bar 122 and is connected, through elbow section 128, to a flanged inlet 130. Nine triangular ports 132, arranged in a circle around nozzle 120, provide for air/oxygen flow from pipe 126 into central section 114, and inclined vanes 134 are attached to the rear of plate 118 at the radially-extending sides of ports 132 to impart a swirl to the air/oxygen flow.

Figure 8:
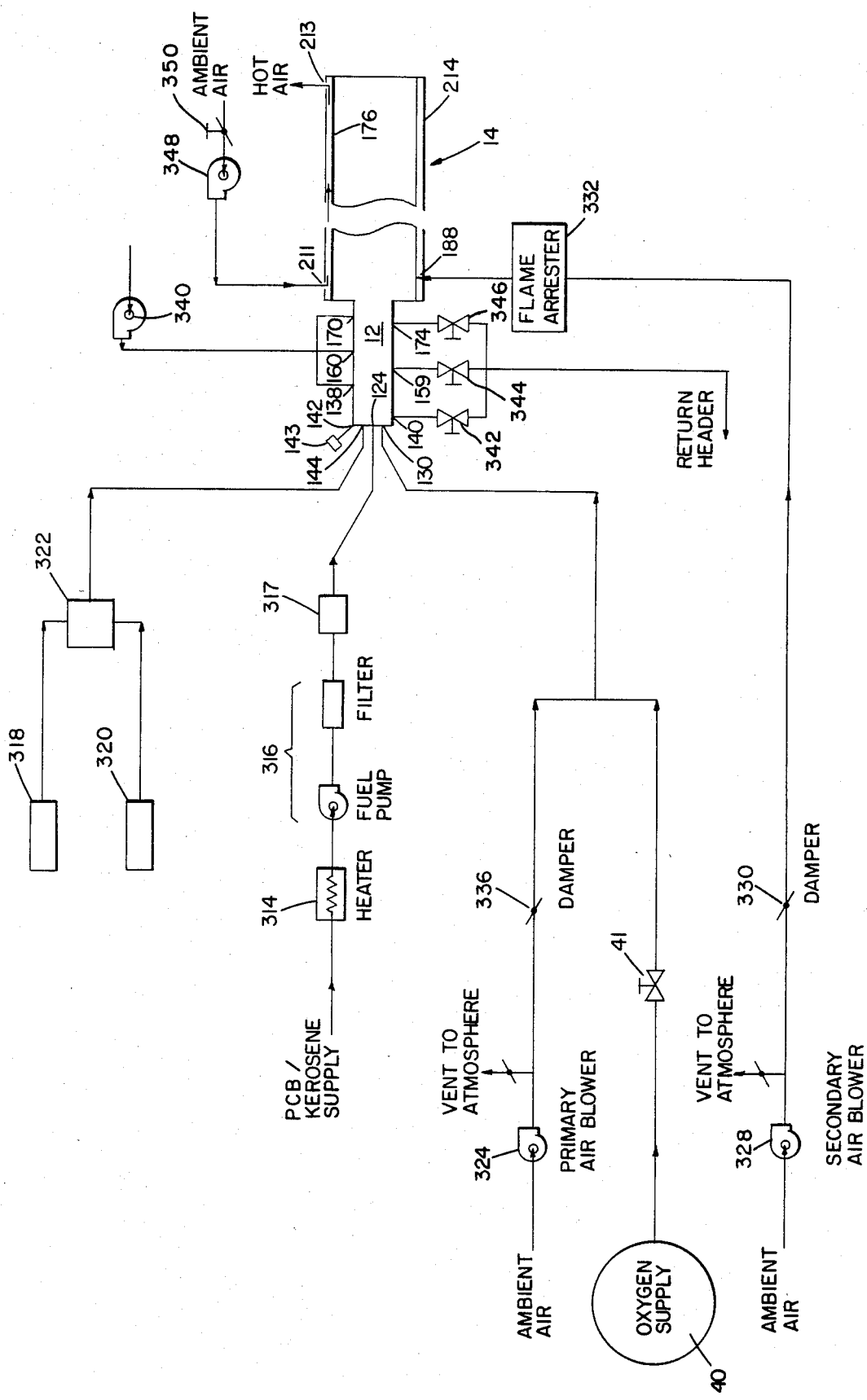

Burner plate assembly 112 includes also a cooling water jacket 136 for cooling the portion of plate 118 between ports 132 and the cylindrical wall of central section 114, an inlet 138 into the water jacket, and an outlet 140 surrounding an inclined viewing port 142 for a flame detector 143 (see FIG. 8). An inclined ignitor port 144, circumferentially spaced about 60 degrees from viewing port 142, permits a propane ignitor to be inserted into central section 114.

Central section 114 includes an inner cylinder 152 of Inconel 625 steel surrounded by a carbon steel water jacket 154. There is a water gap 156 of about ⅛ in. between cylinder 152 and water jacket 154. Flanges 158, 158a each defining twelve radially extending conduits defining, respectively, water outlets 159 and water inlets 160 are mounted at opposite ends of the combustor.

Outlet/inlet section 116 similarly includes an inner cylindrical shell 162 of Inconel 625 (11 ⅝" diameter) steel surrounded by a water jacket 164 to provide an intermediate water gap 166. A flange 168, substantially identical to flanges 158, 158A of central section 114, is provided at the end of outlet/inlet section nearest central section 114. Intermediate the length of outlet/inlet section 116 is a second flange 169, of greater diameter than flange 168. Flange 169 is bolted to the end of secondary combustor 14, and the portion of inlet/outlet section 116 on the side of flange 169 opposite flange 168 thus is within secondary combustor 14. A larger diameter water jacket 172, the exterior of which is defined by Inconel 625 steel, surrounds the portion of outlet/inlet section within secondary combustor 14. Cooling water enters through twelve conduits defining inlets 170 in the flange 168 and flows through water gap 166 to the end of outlet/inlet section 116 within secondary combustor. The water then flows radially into the larger diameter water jacket 172, and then in the other direction back to flange 169 where it exits through four spaced outlet pipes 174.

Referring now to FIG. 2, secondary combustor 14 comprises a steel tube 176, about 54 in. in diameter and 24½ feet long, supported by a pair of steel rings 178. The interior of tube 176 is lined with refractory 180 (A. P. Green Co., Kruzite "D"), the thickness of the refractory layer typically being about 5 inches, leaving within secondary combustor 14 a cylindrical burn zone about 44 in. in diameter. Outlet/inlet assembly 116 of primary combustor 12 is attached to a steel end plate 184 and a similar end plate 186 is attached to the outlet end of tube 176. The inner sides of end plates 184 and 186 are lined with refractory. A pair of tangential inlets 188, each defined by a 4 in. by 6 in. by about 2 ft. long duct of Inconel 625 steel and spaced 180° from the other, are provided about 1 foot from the inlet end of combustor 14, with the sides of the inlets nearest end plate 184 aligned with, or spaced but a short distance axially from, the end of outlet/inlet assembly 114.

Figure 5:
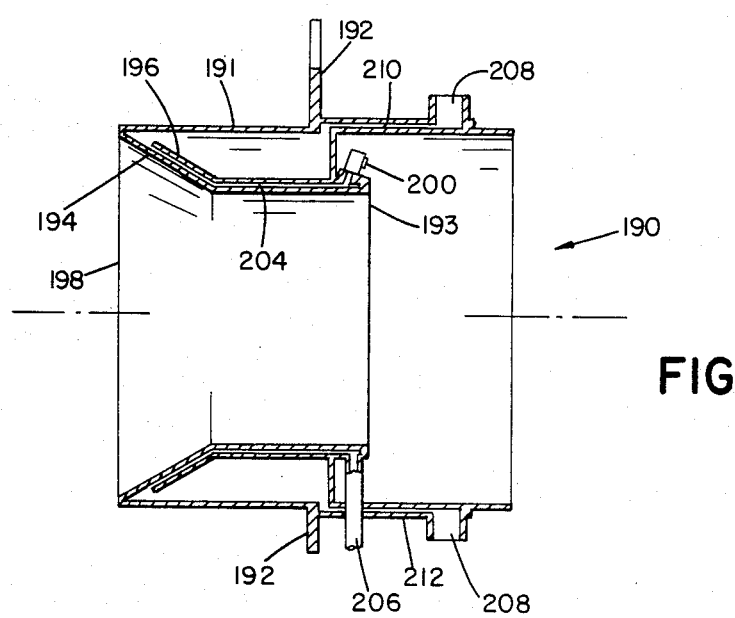

An exit nozzle assembly 190 is mounted on outlet end plate 186, half in and half out of tube 176. As shown most clearly in FIG. 5, exit nozzle assembly 190 includes an outer tube 191 of Inconel 625 steel to which is welded a flange 192 bolted to end plate 186. The portion of assembly 190 within tube 176 includes a converging throat 194 of Inconel 625 steel surrounded by a cooling water jacket 196. The small diameter end 193 of throat 194 is within outer tube 190, a little over two-thirds of the way from the inlet end 198 of tube 190, and mounts six circumferentially spaced spray nozzles 200 (⅛ BX-8 Whirljet Nozzle 316). The inlet to each nozzle 200 communicates with the water gap 204 between water jacket 196 and throat 194, and the nozzles are positioned with their spray outlets directed axially-along, and at a 15 degree angle towards the center of, the exit nozzle assembly. Flow to the water gap 204 and nozzles 200 is provided by a pair of diametrically spaced inlet pipes 206. Inlet and outlet pipes 208 provide for water flow to a water gap 210 between the portion of outer tube 191 exposed to hot gases (i.e., downstream of throat end 193) and the outer water jacket 212.

As shown in FIGS. 2 and 8, an air-cooled shroud, comprising a thin steel cylinder 214 about 58 inches in diameter having an air inlet 211 of the end nearest primary combustor 12 and an air outlet 213 at its other end, surrounds tube 176 and its end plates. There is an air flow cap of about 2 in. between the inside of cylinder 214 and the exterior of tube 176.

Figure 6:
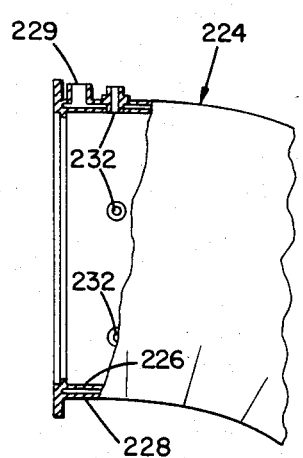
FIG. 6 is a broken view, partially in section, of a portion of the system of FIG. 1; and, FIGS. 7–9 are schematics of portions of the system of FIG. 1.

Quench system 16 (see FIGS. 2, 6 and 9) includes a sump 216, about 57 in. long, 24 in. wide and 22 in. high, having a top plate 218 defining an inlet 220 and an outlet 222. A 90 degree elbow 224 extends from the outlet of exit assembly 190 to sump inlet 220. Elbow 224 includes an inner jacket 226 and outer jacket 228 forming a cooling water gap therebetween and having an outlet 230. Five circumferentially-spaced, radially-inwardly directed nozzles 232, are provided at the inlet end of elbow 224; five more such nozzles 233 are mounted intermediate the length of the elbow.

Figure 9:
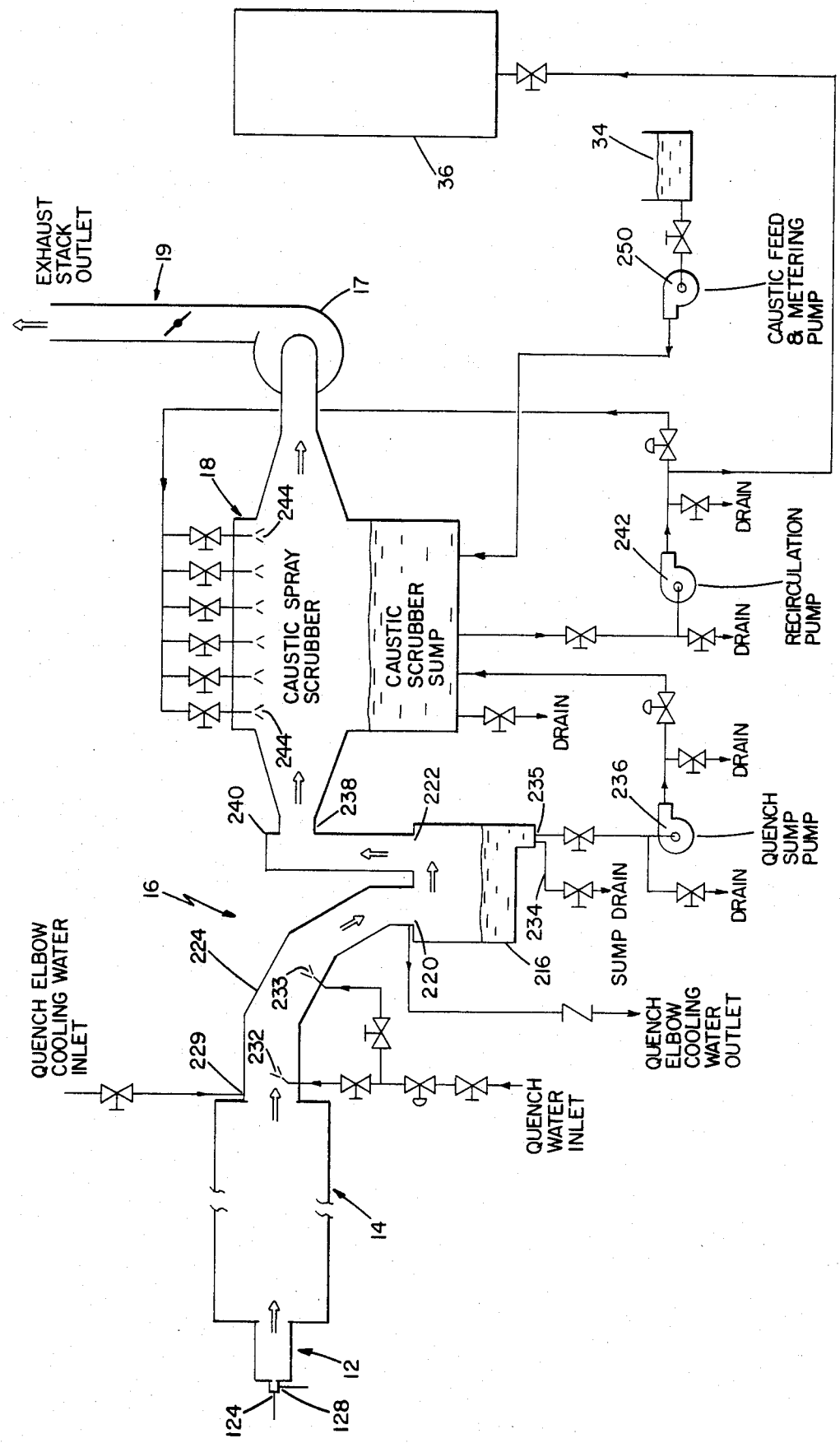

As shown in FIG. 9, a drain 234 and a sump outlet 235, connected to a sump pump 236, are provided at the bottom of sump 216. The outlet from sump 216 is connected, through contact molded tee 238, to mass transfer scrubber 18. A safety relief valve 240 is provided at the top of tee 238. A recirculation pump 242 is connected between the sump and spray nozzles 244 of transfer scrubber 18. Conduits connect recirculation pump 242 also to spent caustic storage tank 36, for discharge of spent caustic; and a caustic feed and metering pump 250 is provided for introducing new caustic from tank 34 to spray scrubber 18.

OPERATION

Figure 7:
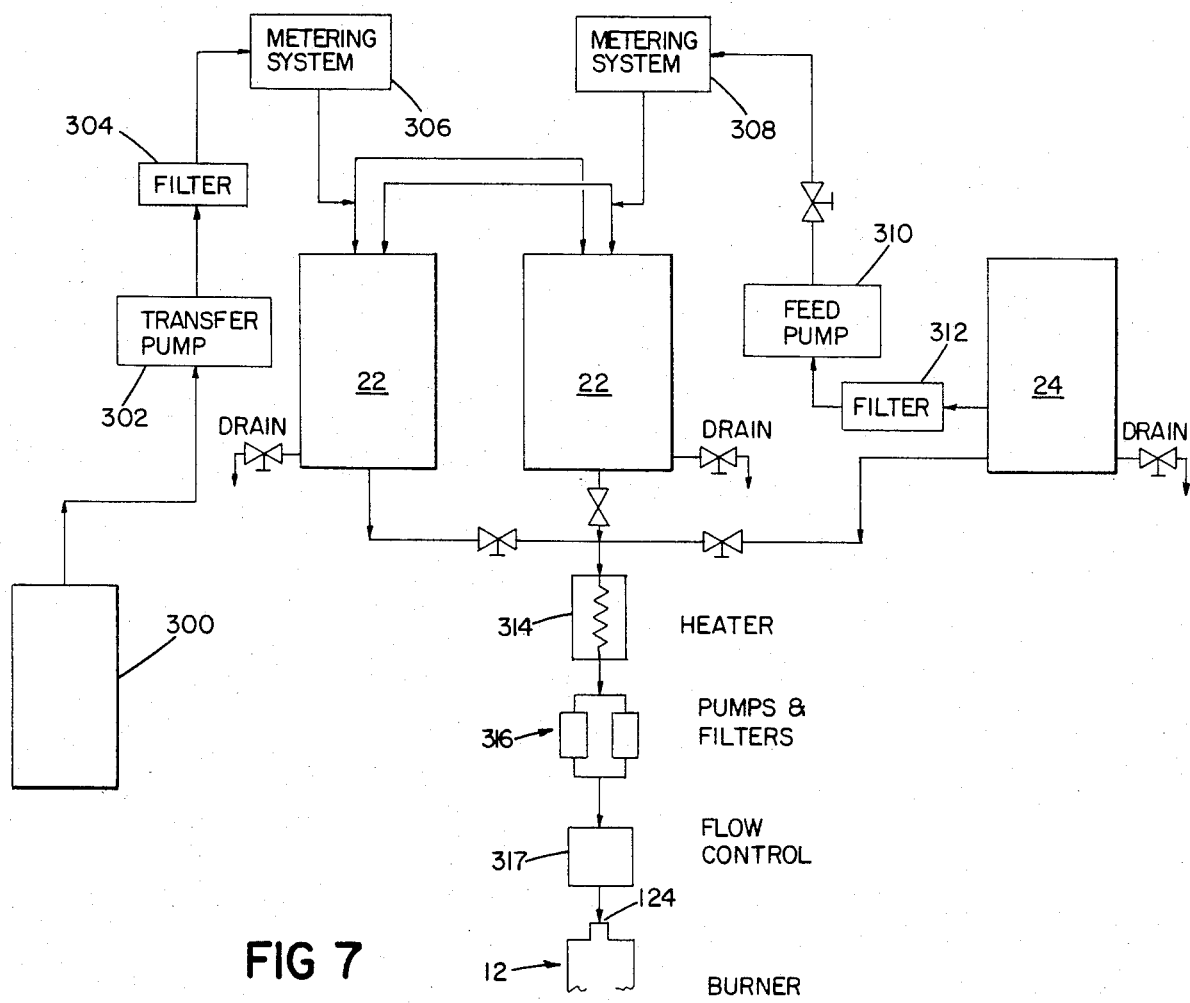

Referring to FIGS. 7 through 9, transfer pump 302 pumps the PCB or other hazardous/toxic waste to be disposed of from a customer-supplied 55 gallon drum 300 through filter 304 to one of tanks 22. The amount of flow is metered by a metering system 306. In tanks 22, the PCB is blended with kerosene from tank 24, so that the blend will have a fuel value of at least about 12,000 BTU/lb.; and the blend is pumped through pump heater 314 and duplex pump/filter 316, through nozzle inlet 124 into primary combustor 12. The rate of flow is controlled by flow control 317.

Typically, a prepared waste/kerosene blend is withdrawn from one of tanks 22 while the blend is being prepared, i.e., the waste and fuel are mixed in the proper predetermined proportions, in the other tank 22. During blending, kerosene from fuel tank 24 is pumped by pump 310 through filter 312, and waste from tank 300 is pumped by pump 302 through filter 304, into the blend tank 22. The flow of kerosene and waste is precisely controlled by metering systems 308, 306.

An oxygen/ambient air mixture is pumped into primary combustor 12 through inlet 130. The oxygen flow from tank 40 is controlled by valve 41, the ambient air is provided by a primary air blower 324, the flow from which is controlled by damper 336. A secondary air blower 328, the flow from which is controlled by damper 330 provides the air into secondary combustor 14. Backflow into the secondary air system is prevented by flame arrester 332.

For initially igniting the PCB/kerosene mixture, a propane torch ignitor 322, connected to regulated propane 318 and air supplies 320, is inserted into primary combustor 14 through ignitor port 144.

Cooling water to the primary combustor is provided by a cold water supply pump 340. As illustrated in FIG. 8 the water enters the inlets 138, 160 and 170 to cool the primary combustor and exits through the outlets 140, 159, and 170 through respective valves 342, 344, 346 which control the respective flows of water and thus the temperature within the cooling jackets 136, 154 and 172 respectively. Cooling air to the secondary combustion chamber is pumped into the inlet 211 from a compressor 348 which receives ambient air through a valve 350, the valve 350 controlling the amount of air supplied and thus the temperature within the air gap between the tube 176 and the cylinder 214.

In typical operation, the PCB/kerosene mixture sprayed into primary combustor 12 is a 50:50 mixture, and is supplied at a rate of about 408.73 pounds of each per hour. Oxygen from tank 40 and ambient air are supplied at rates, respectively, of 1054 and 1951.70 pounds per hour. About 170,056 lbs of cooling water are pumped through the primary combustor's water jackets each hour; the cooling air flow through the air jacket surrounding tank 176 of secondary combustor 14 is about 33,493 lbs/hr; and air is injected tangentially into secondary combustor 14 through ports 188 at a flow rate of about 2033 lbs/hr.

In primary combustor 12, the PCB/kerosene burns, in an oxygen-enriched air atmosphere at sub-stoichometric conditions (e.g. 0.8 stoichometric; a fuel-rich atmosphere), at a temperature ranging from about 4500 deg. F. at the combustor inlet to about 2600 deg. F. at the outlet. The temperature drop is controlled by the cooling water flow. The burning mixture is maintained in the primary combustor for a very short time, e.g., for a matter of milliseconds; but this short time-high temperature combustion has, unexpectedly, been found to accomplish substantially complete destruction of the PCB's, converting them into a mixture of OH, CO, $CO_2$, $H_2$, $H_2O$, $Cl_2$ and HCl.

A typical output of the primary combustor, into the secondary combustor is:
a. OH: 50.08 lbs/hr
b. CO: 708.43 lbs/hr
c. $CO_2$: 831.15 lbs/hr
d. $H_2$: 11.09 lbs/hr
e. $H_2O$: 412.14 lbs/hr
f. NO: 27.14 lbs/hr
g. $Cl_2$: 53.14 lbs/hr
h. HCl: 173.57 lbs/hr
i. $O_2$: 69.20 lbs/hr
j. $N_2$: 1487.20 lbs/hr.

As can be seen, one significant advantage of the high-temperature/short time/sub-stoichometric combustion in primary combustor 12 is a very low level of nitric oxide (NO). The less than stoichometric conditions (e.g., about 0.80 stoichometric) results also in a higher burning temperature. The temperature of the inner wall of primary combustor 12 is maintained well above the dew point (about 500 deg. F.) of HCl to minimize corrosion.

The diameter of secondary combustor 14 is much greater than that of primary combustor 12 (in the illustrated embodiment the inner diameter of primary combustor is 11⅝ in. and that of secondary combustor is about 44 inches; the preferred ratio being, thus being about 4:1 and the ratio always being greater than about 2.5:1); and the high temperature gasses thus undergo turbulent expansion as they are discharged into the secondary combustor. The desired turbulence is obtained by the fact that vanes 134 impart a right-hand swirl to the air/oxygen mixture injected into primary combustor 12, while secondary combustor tangential inlets 188 impart a reverse swirl to the air injected through them into the secondary combustor 14.

In secondary combustor 14, the mixture of gases from primary combustor 12 burns at in an excess air atmosphere (e.g., 1.05 stoichometric) for a much longer period (typically the dwell time in the secondary combustor is about 2 seconds) at lower temperatures, typically in the range of 2000° to 2600° F. near the inlet and about 2200° to 2300° F. at the outlet. The amount of air injected into secondary combustor through tangential inlets 188 is, typically, 2033 lbs/hr at a velocity of about 200 feet per second. As in primary combustor 14, the inner refractory wall of combustor 14 is maintained above the dew point of HCl. Typically, the outlet product from secondary combustor 14 is:
a. $CO_2$: 1944.36 lbs/hr
b. $H_2O$: 525.00 lbs/hr
c. NO: 5.09 lbs/hr
d. HCl: 228.20 lbs/hr
e. $O_2$: 93.73 lbs/hr
f. $N_2$: 3059.78 lbs/hr.

As can thus be seen, the reaction within secondary combustor 14 substantially eliminates the OH, CO, $H_2$ and $Cl_2$ from the input from primary combustor 12, and reduces also the amount of NO.

The product exiting from secondary combustor 14 is quenched with a water spray (typically 3229.2 lbs/hr) in exit nozzle assembly 190 and in quench elbow 224, dropping the temperature of the product and resulting in adiabatic saturation of the gas at a temperature of about 185° F. The resulting HCl liquid is scrubbed with NaOH (from caustic tank 34 at a rate of about 263 lbs/hr.) in scrubber 18, converting the acid to NaCl which is purged to tank 36. The remaining product, i.e., a mixture of $CO_2$, $H_2O$, $O_2$, $N_2$ and a small amount of NO, exits the system through stack 19.

Blower 17 maintains a slightly negative (relative to atmospheric) pressure throughout the system.

The flow of cooling water through the water jacket of primary combustor and of air through the air gap surrounding tube 176 of secondary combustor 14 are controlled so that (i) the temperatures of the cylindrical inner walls of the two combustors will stay above the dew point of HCl and (ii) the temperatures at the outlet of each combustor will be less, by the desired amount, than that at the inlet.

Numerous alterations of the structure herein disclosed will suggest themselves to those skilled in the art. However, it is to be understood that the present disclosure relates to the preferred embodiments of the invention which is for purposses of illustration only and not to beconstrued as a limitation of the invention. All such modifications which do not depart from the spirit of the invention are intended to be included within the scope of the appended claims.

What is claimed is:

1. The method for reducing liquid and slurry hazardous waste to non-hazardous by-products, comprising: blending the waste with a fuel to obtain a blend of liquid fuel and waste having a predetermined minimum fuel value; feeding said blend to a primary combustor; feeding oxygen-enriched air to said primary combustor in an amount such that a fuel rich-atmosphere is provided in said combustor; imparting a rotational swirl in a first direction to said oxygen-enriched air; mixing and burning said blend together with said oxygen-enriched air to obtain a swirling flame in the primary combustor for a relatively short duration at a high temperature; exhausting the products of combustion from said primary combustor to a secondary combustor; feeding secondary air to said secondary combustor in an amount such that an oxygen-rich atmosphere is provided therein, and imparting rotation to said secondary air when entering said secondary combustor in a direction opposite to the rotational direction of the products of combustion entering the secondary combustor; mixing said products of combustion with said secondary air to reduce the rotational swirl thereof while burning said products of combustion with said secondary air for a substantially long duration at a lower temperature than in the primary combustor; controlling the flow rate at which the waste/fuel blend and the oxygen-enriched air are introduced into the primary combustor and the rate at which the air is introduced into the secondary combustor; and quenching the products exiting from the secondary combustor by spraying water into the products.

2. The method as recited in claim 1, wherein said waste is a PCB and the temperature in said primary combustor is approximately 4000° F. and the temperature in said secondary combustor is in the range of 2000° F. to 2600° F.

3. In the method as recited in claim 2, wherein said waste/fuel blend has a heat value of not less than about 12,000 BTU per pound.

* * * * *